United States Patent [19]
Greene

[11] 4,077,715
[45] Mar. 7, 1978

[54] ADJUSTABLE OPTICAL CAM
[75] Inventor: Robert I. Greene, Rochester, N.Y.
[73] Assignee: Itek Corporation, Lexington, Mass.
[21] Appl. No.: 769,998
[22] Filed: Feb. 18, 1977
[51] Int. Cl.² .................. G03B 27/38; G03B 27/70
[52] U.S. Cl. ........................................ 355/57; 355/58
[58] Field of Search ................... 355/11, 56, 57, 58, 355/55

[56] References Cited
U.S. PATENT DOCUMENTS
2,137,028  11/1938  Rau ........................................ 355/57
3,733,128   5/1973  Naumann et al. ................ 355/57 X

FOREIGN PATENT DOCUMENTS
568,274    3/1945  United Kingdom ................... 355/55
1,437,892  6/1976  United Kingdom ................... 355/57

*Primary Examiner*—Donald Griffin
*Attorney, Agent, or Firm*—Homer O. Blair; Robert L. Nathans; Gerald H. Glanzman

[57] ABSTRACT

An automatically focusing optical system for copiers, duplicators and other reproduction equipment having a variable magnification capability. The auto-focusing mechanism comprises a camming means for moving a mirror or other component of the optical system to maintain focus throughout the magnification range of the system. The camming means is additionally designed to be adjustable in such a way that it can accommodate imaging lens systems which differ in focal length within the normal manufacturing tolerance band, and thus replace the family of cams utilized in the prior art to accommodate lenses of different focal length.

8 Claims, 3 Drawing Figures

ADJUSTABLE OPTICAL CAM

BACKGROUND OF THE INVENTION

1. Field of the Invention.

The present invention relates generally to an automatically focusing optical system for copiers, duplicators and other reproduction equipment having a variable magnification capability. More particularly, the present invention relates to an auto-focusing mechanism designed to accommodate imaging lens systems which differ in focal length within the normal manufacturing tolerance band.

2. Description of the Prior Art

The present invention relates to copiers, duplicators and other reproduction equipment with which an original document or the like is to be reproduced. Typically, the optical system of such equipment includes an object plane against which the original document to be reproduced is placed, an image plane against which an imaging medium such as a printing plate or the like is placed, and intermediate optics including one or more mirrors and an imaging lens or lens system for projecting the image of the original document onto the image plane to be reproduced.

When the original and the reproduction are to be the same size or are to vary in size by a constant amount, the various elements in the optical system, i.e., the object plane, mirror(s), lens system and image plane, may be initially located and then maintained in fixed positions relative to one another such that the image projected onto the image plane will always be in focus.

When, however, the system has a variable magnification capability such that the size of the reproduction may be selectively magnified and/or reduced relative to the original, it becomes necessary to change the position of either the object plane, the image plane and/or the mirrors to maintain the system in focus throughout the magnification range. Frequently in office copiers and duplicators, the object plane and the image plane are maintained stationary while the mirror is made movable to maintain proper object to image distance throughout the available range of magnifications, and a variety of systems have been developed in the prior art to accomplish this movement. Usually, these systems incorporate some form of camming means in which the cam surfaces are precisely shaped to effect mirror movement to the positions necessary to achieve proper focus at any magnification.

To ensure exact focus, however, the mirror must be positioned very precisely, and this has resulted in a significant problem. Specifically, it is essentially impossible to make two lenses exactly the same and, as a result, the lenses of different machines will tend to differ slightly in focal length within a normal manufacturing tolerance band (e.g., ± 2%). This difference, although seeming to be slight, will affect the focus of the system by a meaningful amount, and, as a result, in different machines, the mirror has to be moved by differing amounts to maintain focus throughout the full range of magnifications. Because of this, it has become the practice in the prior art to maintain a plurality of slightly different cams in inventory and to select the particular cam for use in the machine that is most correct for the focal length of the particular lens system used.

This is obviously an undesirable practice in that it necessitates that a family of cams be maintained in inventory and this increases the cost of manufacturing the machine. Furthermore, the cam finally selected for use in the machine will usually still not be perfectly matched to the optical system but will be only a close approximation of the cam needed.

SUMMARY OF THE PREFERRED EMBODIMENT

In accordance with the present invention, the above described inadequacies of the prior art have been overcome by the provision of a single camming structure which is readily adaptable for use with lens systems of all focal lengths within the range of normal manufacturing tolerances, and which thus can replace the plurality of cams required by the prior art. In particular, the camming structure according to the presently preferred embodiment of the invention has been designed to be adjustable in such a way that a single cam can be used to approximate the entire family of cams used in the prior art.

With the present invention, the single cam provided can be incorporated into all machines, and then by a simple setting procedure, can be adjusted to move the mirror by amounts required to ensure proper focus throughout the full magnification range of the particular lens or lens system used in the machine.

Specific details of the invention will be set out hereinafter in conjunction with the description of the preferred embodiment.

DETAILED DESCRIPTION OF THE PREFERRED EMBODIMENT

Figure 1:
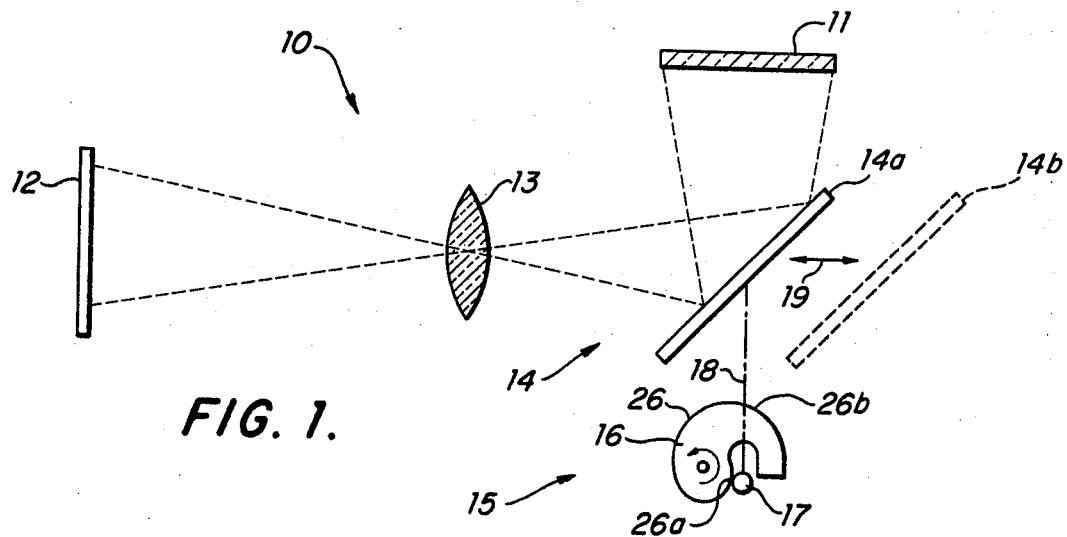
FIG. 1 schematically illustrates the optical system of a copier or duplicator to show the environment within which the present invention may be employed.

FIG. 1 illustrates, in highly schematic form, the optical system of a copier, duplicator or other reproduction machine within which the present invention may be employed. This optical system is generally designated by reference number 10, and includes an object plane 11 (e.g., a glass plate) upon which the original document to be reproduced is to be placed; an image plane 12 (e.g., a support for a printing plate or other medium upon which the reproduction is to be made); a lens system, schematically illustrated by lens 13, for projecting an image of the original onto the object plane, and a mirror 14, for directing light from the original to the lens system. Other portions of the system such as the light source for illuminating the original document and the like are not shown because they are not relevant to an understanding of the present invention.

Also illustrated in FIG. 1, in highly schematic form, is the mirror position control means 15 of the present invention which includes a cam 16, a cam follower 17 and mechanical coupling means 18 for coupling the cam follower to the mirror 14. As will be explained in detail hereinafter, rotation of the cam 16 will cause cam follower 17 to drive the mirror back and forth in the direction indicated by arrow 19 via coupling means 18 in order to position the mirror in the correct locations to ensure that the image formed on image plane 12 will be in proper focus at any magnification achievable by the system. In FIG. 1, the mirror is illustrated at 14a in solid line in its 100% magnification position and at 14b in dotted line in its 64% magnification position. As will be explained hereinafter, follower 17 will be adjacent portion 26a of cam surface 26 when mirror is in position 14a and adjacent portion 26b when mirror is in position 14b. The mirror will be at intermediate positions for intermediate magnifications.

Figure 2:
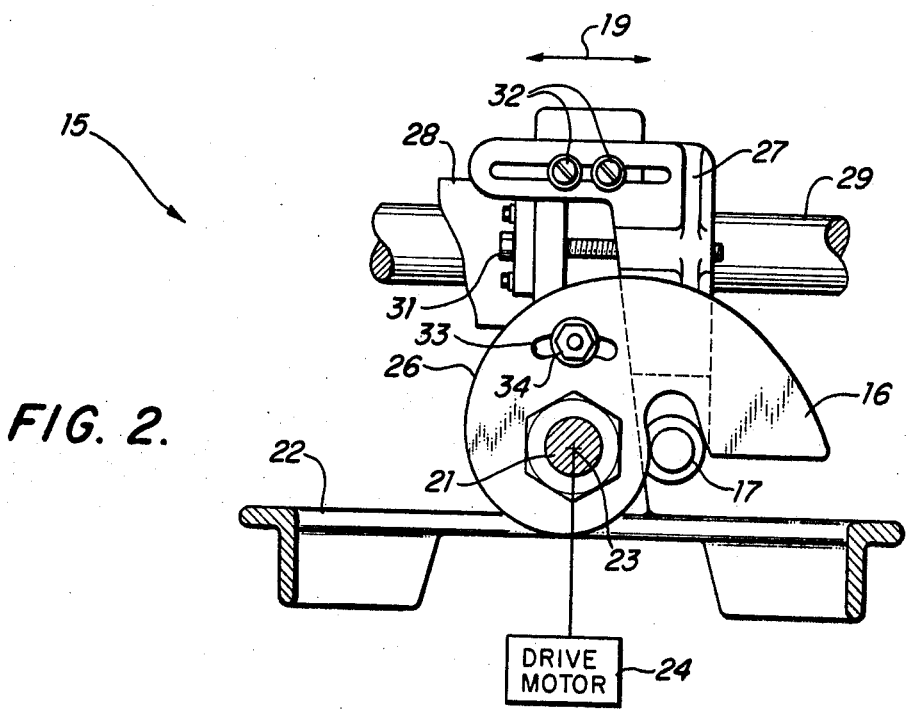
FIG. 2 illustrates the details of the camming structure according to a presently most preferred embodiment of the invention.

The details of the mirror position control means 15 are illustrated more clearly in FIG. 2. Specifically, it includes a specially designed cam 16 supported for rotation on a shaft 21, in turn, supported on base 22. More particularly, cam 16 is adapted to be rotated about central axis 23 by a drive motor or other means coupled to shaft 21 as illustrated at 24.

As the cam is rotated, cam follower 17 will be carried around cam surface 26, and it will, in turn, move the linkage means 27 to drive mirror support 28 and the mirror coupled thereto (not shown in FIG. 2) back or forth along shaft 29 in the direction indicated by arrow 19.

Also illustrated in FIG. 2 are adjustment screws 31 and 32. These are used to initially align the mirror position with the cam position as will be explained hereinafter.

Finally, FIG. 2 also illustrates the adjustment structure to permit the single cam 16 to approximate the entire family of cams employed in the prior art to accommodate lenses of slightly different focal length. This structure consists of a slot 33 cut into the cam for receiving a bolt 34 mounted to support 22. By loosening bolt 34, the cam can be pivoted slightly to change the orientation of cam surface 26 relative to follower 17 to approximate the different cams previously used. The manner in which this is accomplished can best be understood with reference to FIG. 3.

Initially, it should be understood that the preferred embodiment of the present invention was designed for an optical system having a variable magnification capability of from about 100% down to about 64% of the size of the original. The particular cam employed in the system and to be described herein, therefore, was designed to maintain the image in focus throughout this particular range. It should be clearly understood, however, that the invention should not be limited to this particular embodiment, but is fully capable of being incorporated into optical systems for enlarging or reducing originals within other ranges.

Figure 3:
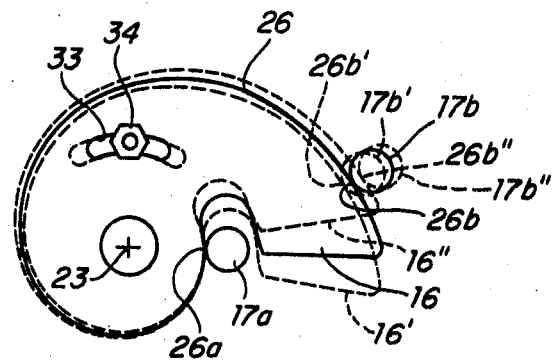
FIG. 3 is a diagram provided to help explain the present invention.

With reference to FIG. 3, cam 16 is illustrated in three, slightly different orientations. This cam was initially designed to be correct for the nominal focal length lens employed in the system, i.e., the theoretically perfect focal length lens; and were such a lens to be in the system, the cam would be in the orientation illustrated in solid line in FIG. 3. When the cam is in this orientation and when the cam is rotated to the position illustrated in FIG. 3, the cam follower 17 will be substantially at the position indicated at 17a. When the cam follower is at this position relative to the cam, the mirror will be at the proper position for correct focus at 100% magnification. Thus, location 26a of cam surface 26 comprises the 100% or maximum magnification location of the cam surface. When the cam has been rotated counterclockwise (approximately 342° for this particular design) such that the cam follower 17 is at position 17b relative to the cam surface, the mirror will be at the proper 64% magnification position. Thus, location 26b of cam surface 26 comprises the 64% or minimum magnification location. When the cam follower is at intermediate positions relative to the cam surface, the mirror will be positioned for intermediate magnifications between 64% and 100%.

What has been described so far is fairly conventional, and if all lens systems employed were of nominal focal length, nothing further would be necessary. When the focal length of the lens actually used in the system does not have a nominal focal length, however, but varies somewhat between ± 1 or ± 2% from the nominal length within the normal manufacturing tolerance band, this cam would not correctly position the mirror to achieve focus at all magnifications. In the prior art, as mentioned above, a slightly differently shaped cam would be used for these different focal lengths.

In accordance with the present invention, however, it has been found that if cam 16, designed for the nominal focal length lens, is pivoted about the approximate circle that defines the vicinity of the 100% magnification location, the cam surface 26 can be made to accurately approximate the surfaces of the other cams that would be theoretically correct for the other focal lengths in the normal manufacturing tolerance band.

In other words, it has been found that if the nominal cam is oriented to provide proper focus at the 100% magnification location, it can then be rotated about the approximate circle that defines the vicinity of the 100% magnification location until it is oriented to provide proper focus at the 64% location (and at all locations in between) without substantially affecting the focus at the 100% location. Structurally, this is accomplished by loosening bolt 34 and rotating the cam slightly in one direction or the other with the bolt sliding in slot 33, and then locking the bolt in the proper position relative to slot 33. The slot is shaped such that the cam will rotate around axis 23 which is approximately concentric to the section of cam surface 26 in the vicinity of 26a, the 100% magnification location, and thus, rotation of the cam will not affect proper focus at this 100% location.

This is clearly illustrated in FIG. 3 where two other orientations of cam 16 are shown in dotted line. Specifically, cam orientation 16' illustrates the cam orientation for a lens of shorter than nominal focal length, while orientation 16" illustrates the cam rotated for a lens of slightly longer than nominal focal length. In these two orientations it can be seen that the 64% location of cam surface 26 has been shifted slightly to locations 26b' and 26b" while the 100% location 26a, has essentially not moved. With the shift of the cam surface, the position of follower 17b will be at 17b' and 17b" relative to surface 26 for 64% magnification and the mirror position will shift correspondingly.

In operation, any machine having a focal length within the normal manufacturing tolerance band can be adjusted to be in focus for any magnification between 100% and 64% in the following manner. Initially, the cam is rotated about pivot axis 23 to the 100% magnification location (i.e., until cam follower is in position 17a). Screws 31 and 32 are then loosened and the mirror is moved by hand until the system is in focus. Screws 31 and 32 can then be locked and need no longer be touched. The nominal cam surface actually goes from about 102% to about 62% so there is sufficient room on the cam surface to make this adjustment. The cam is then rotated by a fixed amount (e.g., 342° in our embodiment) to put the cam follower at the nominal 64% magnification position (i.e., position 17b). Bolt 34 is then loosened and the cam is pivoted until the lens is in focus at this minimum reduction position. The bolt 34 is then tightened and the cam will be properly adjusted to provide proper focus for all positions from 100% down to 64%.

While what has been described is a presently most preferred embodiment, the present invention should not be so limited. As mentioned above, it could be practiced for different magnification ranges. Also, the cam could be coupled to components other than the mirror as is desired. Finally, in some embodiments, the system may employ more than one mirror.

Because many additions, alterations or modifications can be made, the invention should be limited only insofar as required by the scope of the claims.

What is claimed is:

1. A variable magnification optical system comprising:
    A. object bearing surface means, image receiving surface means and mirror surface means, at least one of said surface means being relatively moveable;
    B. imaging lens means for projecting an image of an object onto said image receiving surface means from said object bearing surface means; and
    C. positioning means for positioning said moveable surface means to maintain said image in focus at any desired magnification, said positioning means comprising:
        a. cam means having a camming surface;
        b. follower means cooperating with said camming surface, said follower means being coupled to said moveable surface means;
        c. means for moving said cam means relative to said follower means to position said follower means at a location of said camming surface corresponding to said desired magnification, said follower means moving said moveable surface means to a position to maintain said image in focus at said desired magnification; and
        d. adjustment means for adjusting the orientation of said camming surface relative to said follower means to compensate for any variations in focal length of said imaging lens means.

2. Apparatus as recited in claim 1 wherein said camming surface of said cam means is designed for an imaging lens means of nominal focal length relative to a normal manufacturing tolerance band, and wherein said adjustment means comprises means for adjusting the orientation of said camming surface relative to said follower means to compensate for any variations between the actual focal length of said imaging lens means and said nominal focal length.

3. Apparatus as recited in claim 2 wherein said adjustment means comprises means for adjusting the orientation of said camming surface relative to said follower means to position said follower means at an adjusted location of said camming surface corresponding to said desired magnification to, in turn, move said moveable surface means to an adjusted position to maintain said image in focus at said desired magnification.

4. Apparatus as recited in claim 3 wherein said optical system has a variable magnification capability extending from a maximum magnification to a minimum magnification, and wherein said camming surface extends from a corresponding maximum magnification location to a corresponding minimum magnification location, and wherein said adjustment means includes means for pivoting said cam means about the approximate circle that defines the vicinity of the maximum magnification location of said camming surface until said minimum magnification location of said camming surface is at an adjusted minimum magnification location relative to said follower means, whereupon all locations on said camming surface will be adjusted to locations to maintain said image substantially in focus at any desired magnification from said maximum magnification to said minimum magnification.

5. Apparatus as recited in claim 4 wherein said adjustment means includes locking means coupled to said cam means, said locking means being releasable for permitting said cam means to be pivoted.

6. Apparatus as recited in claim 5 wherein said cam means includes slot means and wherein said locking means includes bolt means extending through said slot means.

7. Apparatus as recited in claim 3 wherein said movable surface means comprises said mirror surface means.

8. Apparatus as recited in claim 7 wherein said optical system has a variable magnification capability extending from a maximum magnification to a minimum magnification, and wherein said camming surface extends from a corresponding maximum magnification location to a corresponding minimum magnification location, and wherein said adjustment means includes means for pivoting said cam means about the approximate circle that defines the vicinity of the maximum magnification location of said camming surface until said minimum magnification location of said camming surface is at an adjusted minimum magnification location relative to said follower means, whereupon all locations on said camming surface will be adjusted to locations to maintain said image substantially in focus at any desired magnification from said maximum magnification to said minimum magnification.

* * * * *